United States Patent

[11] 3,596,605

| [72] | Inventor | Richard J. Shelstad<br>P. O. Box 35, Butler, Wis. 53007 |
|---|---|---|
| [21] | Appl. No. | 770,327 |
| [22] | Filed | Oct. 24, 1968 |
| [45] | Patented | Aug. 3, 1971 |

[54] CONVEYOR MECHANISM
4 Claims, 4 Drawing Figs.

[52] U.S. Cl. .................................................. 104/172, 104/176
[51] Int. Cl. ............................................. B65g 19/24
[50] Field of Search ........................................ 104/172, 178, 176; 105/27

[56] References Cited
UNITED STATES PATENTS

| 2,729,172 | 1/1956 | Grossmith | 104/172 |
| 2,107,465 | 2/1938 | Borggaard | 104/172 |
| 3,260,219 | 7/1966 | Vani | 104/172 |

FOREIGN PATENTS

| 923,434 | 2/1955 | Germany | 104/176 |

Primary Examiner—Arthur L. La Point
Assistant Examiner—Robert Saifer
Attorneys—John W. Michael, Gerrit D. Foster, Bayard H. Michael, Paul R. Puerner, Joseph A. Gemignani, Andrew O. Riteris and Spencer B. Michael ABSTRACT: A conveyor mechanism for moving a car through an automatic car wash comprising a plurality of spaced drive unit assemblies fastened to a drive chain. Each drive unit is comprised of a trolley frame having a small set of front rollers and a larger set of rear rollers mounted thereon. Both sets of front and rear rollers engage the tire of the car and cause it to roll along a predetermined path. A third set of support rollers are mounted on the trolley frame outboard of said front and rear tire engaging rollers. The support rollers roll on bearing strips positioned along the conveyor path and serve to stabilize the load exerted on the drive unit assembly by the car tire during the conveying operation.

PATENTED AUG 3 1971
3,596,605
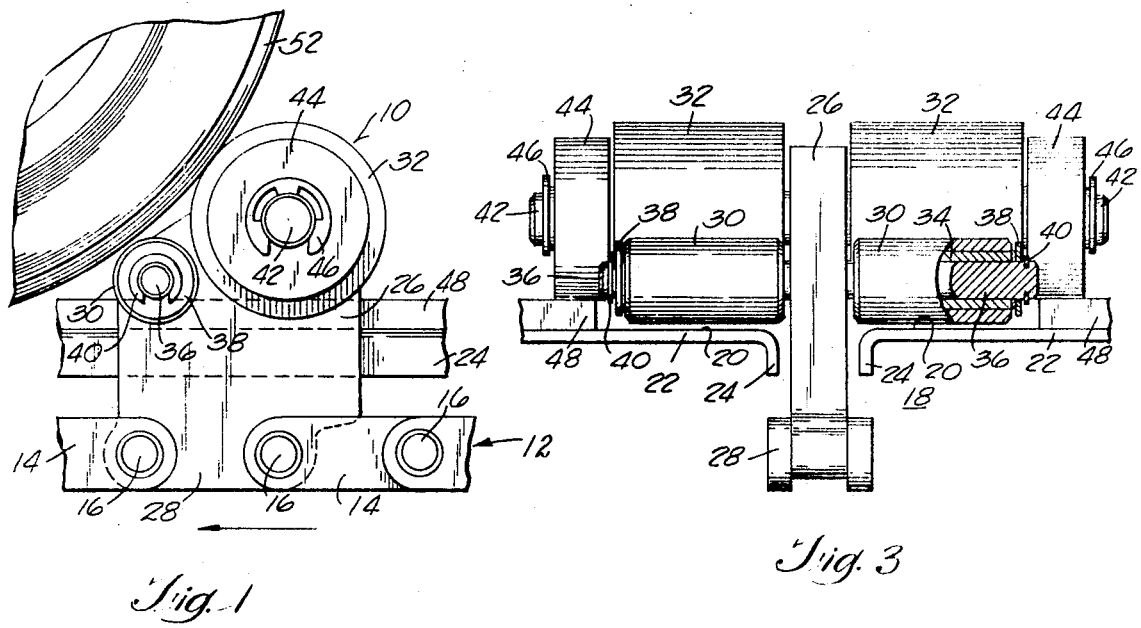
Fig. 1
Fig. 3
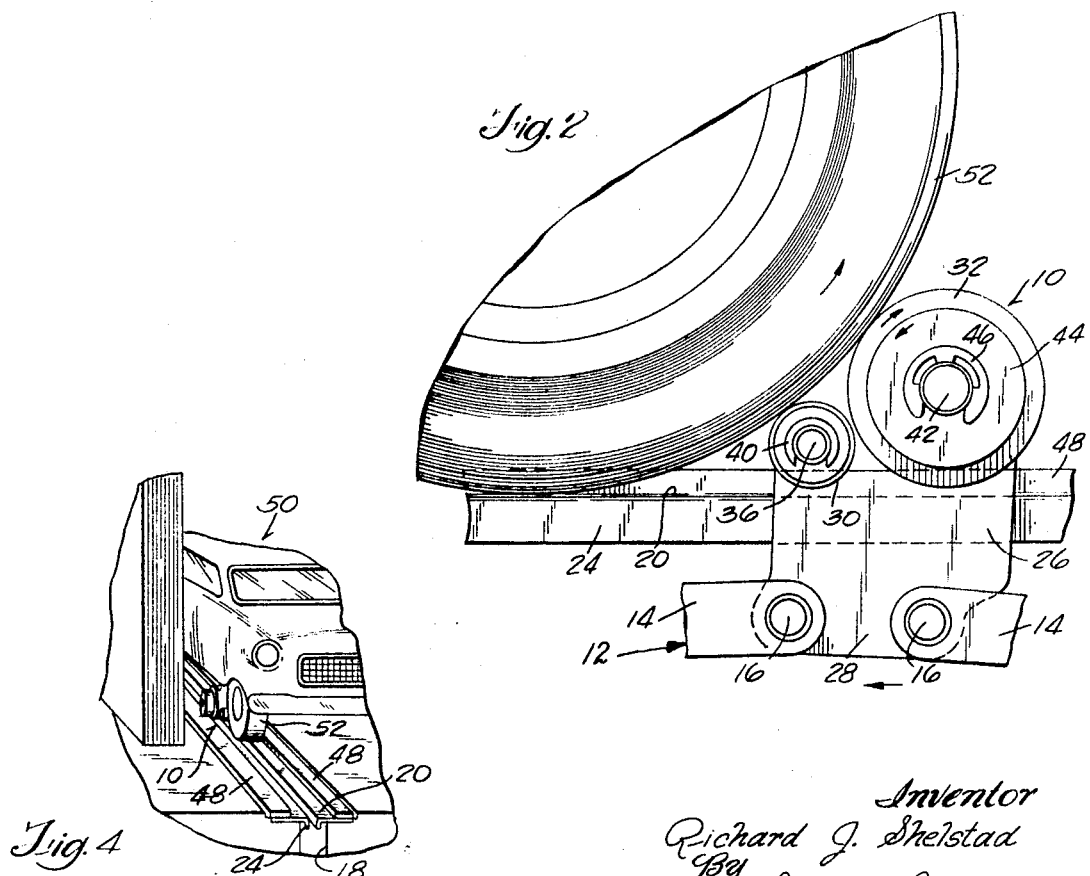
Fig. 2
Fig. 4
Inventor
Richard J. Shelstad
By Paul R. Puerner
Attorney

CONVEYOR MECHANISM

BACKGROUND OF THE INVENTION

1. Field of the Invention

This invention relates to a conveyor mechanism for wheeled vehicles, and more particularly to a conveyor for moving a car through an automatic car wash installation.

2. Description of the Prior Art

The closest prior art known to applicant is U.S. Pat. No. 3,260,219 dated July 12, 1966.

The object of this invention is to provide a somewhat simplified and more smoothly operating conveyor than that shown in the prior art identified above.

SUMMARY OF THE INVENTION

A conveyor mechanism for moving a car along a predetermined path of travel comprising a support surface along which the wheels can roll freely and a drive chain mounted for movement along the path of travel. A plurality of spaced drive unit assemblies are operatively connected to the drive chain and serve to engage one tire of the car and cause it to roll along the predetermined path of travel. Each drive unit is comprised of a trolley frame fastened to the drive chain and front and rear sets of tire engaging rollers mounted on the trolley frame. The front rollers are smaller than the rear rollers and both sets of rollers become engaged with the car tire during the conveying operation. A third set of support rollers are mounted on the trolley frame outboard of the tire engaging rollers and serve to stabilize the load exerted on the drive unit assembly by the car tire.

DESCRIPTION OF THE DRAWINGS

FIG. 1 is a side elevation view showing one drive unit of a conveyor mechanism embodying the present invention in a position wherein the drive unit makes initial contact with the tire on an automobile wheel;

FIG. 2 is a view similar to FIG. 1 but showing the drive unit in a position wherein the unit is in driving engagement with the automobile wheel;

FIG. 3 is a front elevation view of the conveyor mechanism shown in FIG. 1 (with certain parts broken away); and FIG. 4 is a fragmentary perspective view of an automobile being conveyed by the conveyor mechanism of this invention.

As shown in the drawings, the conveyor mechanism of this invention is comprised of a drive unit assembly 10 operatively connected to a drive chain means 12 for the purpose of moving an automobile or other wheeled vehicle along a predetermined path. As previously indicated, while the conveyor of this invention can be usefully employed in a variety of different applications, it is particularly designed for conveying automobiles through what is commonly known as an automatic car wash installation. In such an installation, the conveyor mechanism would be comprised of a single drive chain 12 and a plurality of drive units 10 fastened to the chain at spaced intervals.

The drive chain means 12 may be of any suitable construction such as that shown in the drawings wherein it is comprised of a plurality of links 14 pivotally connected together by pins 16 in a conventional manner. Similarly, the chain may be driven at a predetermined constant speed (preferably about 20 feet per minute) by means of an electric motor (not shown) or other suitable device.

The chain 12 is mounted in a trench 18 for movement at an elevation below the level of the tire supporting surfaces 20 on which the car rolls through the car wash installation. As shown, tire supporting surfaces 20 are provided by elongated track members 22 having downwardly extending flanges 24 which are spaced from each other to permit connection of the drive units 10 with the chain 12.

Each drive unit 10 is comprised of a centrally located trolley frame 26 which is operatively connected to the drive chain 12 by any suitable arrangement. In the preferred embodiment, such connection is accomplished by making the trolley frame 26 and one link 28 of the chain integral with each other. Such arrangement provides a strong and permanent driving connection between the drive unit 10 and the chain 12.

Each drive unit 10 further includes a pair of front tire engaging rollers 30, 30 and a pair of rear tire engaging rollers 32, 32. Front rollers are rotatably mounted on the front portion of trolley frame 26 by means of a shaft 34 which passes through an opening in the trolley and is fixedly mounted therein by a press fit. Rollers 30, 30 are retained on shaft 34 by any suitable means such as a plug 36, a washer 38 and a retaining snapring 40 as clearly shown in FIG. 3.

Rollers 32, 32 are rotatably mounted on the rear portion of trolley 26 by means of a shaft 42 which passes through an opening in the trolley and is fixedly mounted therein by a press fit. In addition to rollers 32, 32 a second pair of support rollers 44, 44 are also rotatably mounted on shaft 42 outboard of rollers 32, 32. Sets of rollers 32 and 44 are retained on shaft 42 by any suitable means such as snaprings 46 as shown.

As most clearly shown in FIG. 3, a pair of support strip members 48, 48 are mounted along each side of tire support track members 22, 22 upon which support rollers 44, 44 are adapted to roll. As so arranged, the surface 20 on which the tire rolls will be spaced slightly below the surface of members 48, 48 on which support rollers 44, 44 will roll. Support rollers 44 serve as the "wheels" for the drive unit and act to stabilize the load exerted on the drive unit by the car tire.

While the respective sizes of rollers 30, 32 and 44 may vary to some extent, the diameter of rear rollers 32 is considerably greater than the diameter of front rollers 30. For example, in the preferred embodiment, the diameter of rollers 32 is 3⅜ inches and the diameter of rollers 30 is 1½ inches. It is also noted that the diameter of support rollers 44 is somewhat less than the diameter of rollers 32. In the preferred embodiment, the diameter of rollers 44 is 2⅜ inches. This insures that there will be no contact between such support rollers 44 and the car tire during operation as will be more fully described hereinafter.

OPERATION

In the preferred embodiment, the car 50 is positioned at the entrance to the conveyor so that one front tire 52 thereof will be engaged by a drive unit assembly 10 of the conveyor mechanism. It should be understood, however, that conveying of the car could be accomplished by engagement of the drive unit with the rear tire.

As shown in FIG. 1, initial contact of the drive unit with the car tire is made by rear rollers 32. At this position of initial contact, it is noted, there is no contact between front rollers 30 and the tire. As the drive unit 10 continues to move forwardly (see arrow in FIG. 1), the initial load exerted on the drive unit through rollers 32 will tend to cause the trolley frame 26 to be pivoted in a clockwise direction around the axis of shaft 42 which in turn will cause front rollers to rise up into contact with the tire to thereby assume a position like that shown in FIG. 2.

The FIG. 2 position shown the drive chain cocked upwardly at link 28. While the drive chain will tend to assume a slightly cocked position like that shown in FIG. 2, the cocking of the chain has been exaggerated for purposes of illustration. In any event, it is clear from the foregoing that any tendency of the trolley frame to pivot out of its normal position as the drive unit makes contact with the car tire will be stabilized by the combined action of front rollers 30 (bearing on the tire) and support rollers 44 (bearing on support strips 48).

After the drive unit assumes the position shown in FIG. 2, continued movement of the drive unit will cause the car to be rolled smoothly along the track members 22. Both sets of rollers 30 and 32 will remain in contact with the tire during the conveying operation with tire 52 rotating in a counterclockwise direction, rollers 30 and 32 rotating in a clockwise direction and rollers 44 rotating in a counterclockwise direction as viewed in FIG. 2. Support rollers 44 which roll on support strips 48 serve as the "wheels" for the drive unit assembly 10 and thereby act to stabilize the load exerted on the drive unit by the car tire during the conveying operation.

It is clear from the foregoing that the "double driving" contact provided by rollers 30, 32 produces a firm and stable drive arrangement with a minimum of wear on the equipment. By positioning the small rollers 30 at the front of the drive unit the danger of accidentally catching a person's toes under the advancing drive unit is minimized.

If for any reason (such as the application of the car's brakes) the car would be prevented from rolling freely on the conveyor, the drive unit 10 will simply ride under the car tire without damage to the car or the conveyor mechanism. Here again the location of small rollers 30 on the front of the drive unit will facilitate this "riding under" action with a minimum of stress and strain on the equipment.

I claim:

1. A conveyor mechanism for moving a car along a predetermined path of travel comprising:
   a support surface along which the car wheels can roll freely;
   a drive chain means mounted for movement along the path of travel;
   a drive unit assembly operatively connected to said drive chain means and adapted to engage a tire of the car and cause it to roll along said support surface, said drive unit assembly including,
   a trolley frame member fastened to said drive chain means,
   a first pair of tire engaging rollers mounted on opposite sides of the front portion of said trolley frame,
   a second pair of tire engaging rollers mounted on opposite sides of the rear portion of said trolley frame member, said first and second pairs of tire engaging members engaging a tire on said car and causing it to roll along said support surface as said unit is driven by said drive chain means, said first pair of tire engaging rollers being of smaller diameter than said second pair of tire engaging rollers, said first pair of rollers making contact with the car tire at a point between the point at which said second pair of rollers contacts the tire and the point at which the tire contacts the support surface, and
   a third pair of rollers mounted on said trolley frame member positioned for rolling contact with a bearing surface extending along the path of travel, said third pair of rollers serving to stabilize the force exerted on said drive unit assembly by the car tire as the car is conveyed over said support surface; and
   a drive means for driving said chain means.

2. A conveyor mechanism according to claim 1 in which said first and second tire engaging rollers are positioned so that initial contact of the drive unit assembly with the tire is made by said second pair of rollers causing said trolley frame member to pivot slightly whereby said first pair of rollers will move into contact with the tire.

3. A conveyor mechanism according to claim 1 in which said second and third sets of rollers are mounted on a common shaft with said third pair of rollers positioned outboard of said second pair of rollers.

4. A conveyor mechanism according to claim 3 in which the diameter of said third pair of rollers is slightly less than the diameter of said second pair of rollers.